(12) United States Patent
Mese

(10) Patent No.: US 9,571,159 B2
(45) Date of Patent: Feb. 14, 2017

(54) DATA COMMUNICATION OVER POWER SUPPLY LINES OF AN ELECTRONIC SYSTEM

(71) Applicant: Broadcom Corporation, Irvine, CA (US)

(72) Inventor: Murat Mese, Rancho Palos Verdes, CA (US)

(73) Assignee: BROADCOM CORPORATION, Irvine, CA (US)

( * ) Notice: Subject to any disclaimer, the term of this patent is extended or adjusted under 35 U.S.C. 154(b) by 645 days.

(21) Appl. No.: 13/873,480

(22) Filed: Apr. 30, 2013

(65) Prior Publication Data

US 2014/0294103 A1 Oct. 2, 2014

Related U.S. Application Data

(60) Provisional application No. 61/807,065, filed on Apr. 1, 2013.

(51) Int. Cl.
*H04B 3/54* (2006.01)

(52) U.S. Cl.
CPC .............. *H04B 3/542* (2013.01); *H04B 3/548* (2013.01)

(58) Field of Classification Search
None
See application file for complete search history.

(56) References Cited

U.S. PATENT DOCUMENTS

| | | | |
|---|---|---|---|
| 2003/0156014 A1* | 8/2003 | Kodama | H04B 3/54 375/258 |
| 2012/0193987 A1* | 8/2012 | Siglock | H02J 3/386 307/64 |
| 2014/0198859 A1* | 7/2014 | Farrokhi | H04L 7/0008 375/257 |

* cited by examiner

*Primary Examiner* — Jared Fureman
*Assistant Examiner* — Aqeel Bukhari
(74) *Attorney, Agent, or Firm* — Oblon, McClelland, Maier & Neustadt, L.L.P.

(57) ABSTRACT

Disclosed are various embodiments for communicating information between various electronic components. A local device may comprise a transmitter to convert communication signals into modulated signals. Modulated signals are injected into a shared power supply line. The remote device may comprise a receiver for identifying the injected signal, demodulating the injected signal, and processing the demodulated signal.

20 Claims, 5 Drawing Sheets

DATA COMMUNICATION OVER POWER SUPPLY LINES OF AN ELECTRONIC SYSTEM

CROSS-REFERENCE TO RELATED APPLICATIONS

This application is a utility application that claims priority to U.S. Provisional Patent Application titled, "Data Communication over Power Supply Lines of an Electronic System", having Ser. No. 61/807,065, filed Apr. 1, 2013, which is entirely incorporated herein by reference.

BACKGROUND

Electronic systems are made up of multiple chips and/or circuits. One portion of the electronic system may need to communicate data to another portion of the electronic system. For example, a processor may send data to other chips within the electronic system. To this end, a communication bus may exist to facilitate data communication between one chip and another chip or one portion of a chip to another portion of a chip. The use of a communication bus may require hardware resources such as a bus interface and/or a bus controller.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to data communication between circuit devices within an electronic system. Specifically, the electronic communication system may leverage power supply lines that interconnect various circuit devices as a channel for data communication. In various embodiments, a first circuit device may transmit communication data over a Direct Current (DC) power supply line. To accomplish this, the first circuit device may convert the communication data from the digital domain into the analog domain to generate an analog signal, modulate the analog signal to generate a modulated signal, and inject the modulated signal into a DC power supply line that is shared by the first circuit device and a second circuit device.

The second circuit device may be powered via the DC power supply line. Furthermore, the second circuit device may receive the modulated signal by filtering the power supply signal in the DC power supply line to generate a filtered power supply signal, demodulate the filtered power supply signal to generate a demodulated signal, convert the demodulated signal from the analog domain into the digital domain to generate a digital signal, and decode the digital signal. In this respect, the second circuit device receives the communication data that was transmitted by the first circuit device via the DC power supply line.

By using the DC power supply line to communicate data from one circuit device to another, the reliance on communication bus interfaces and/or communication bus controllers may be reduced or otherwise minimized. For example, an electronic system may use a communication bus to transmit data from one circuit device to another. However, the use of the communication bus may require a significant amount of hardware resources. By migrating at least a portion of the data communication from the communication bus to the power supply line, a reduction of hardware resources may be realized. In some embodiments, the data communication occurs entirely through the power supply lines. Thus, the communication bus may be completely removed from the circuit device.

Figure 1:
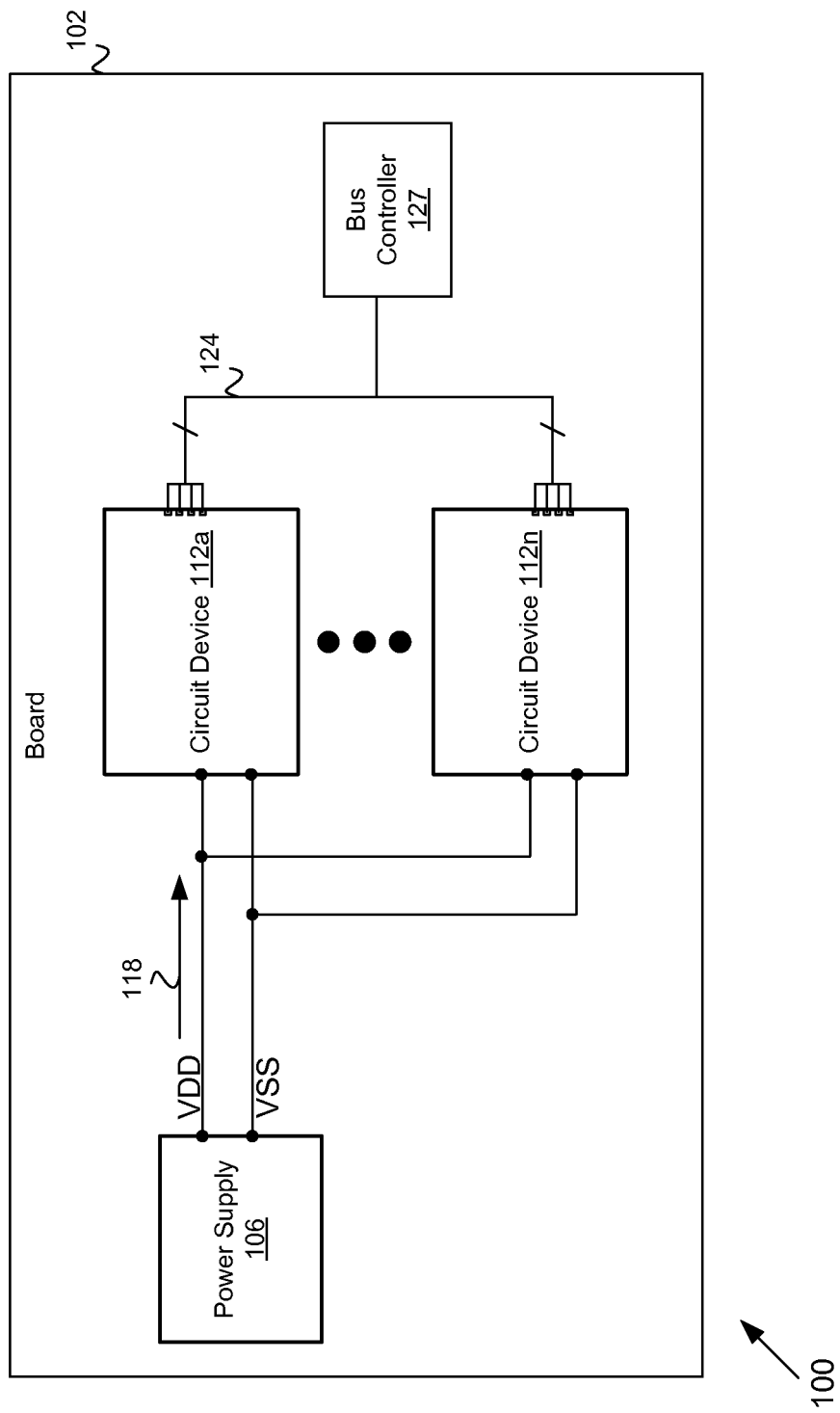
FIG. 1 is a drawing of an example of an electronic system at a board level, according to various embodiments of the present disclosure.

With reference to FIG. 1, shown is an electronic system 100 according to various embodiments of the present disclosure. The electronic system 100 comprises a board 102. The board 102, for example, may be a printed circuit board or any other board configured for mounting circuits, wires, or any other electronic components. The board 102 may comprise any platform to facilitate an integration or mounting of multiple circuit components. The board 102 may also represent a plurality of boards that are coupled together. According to some embodiments, the board 102 comprises a power supply 106 for supplying a DC voltage to the various circuit components of the board 102.

References made to direct current (DC), as described herein, include voltage signals, current signals, and/or power supplies that are DC or substantially DC. It is understood that some negligible frequency components may exist in a DC signal and it is understood that some negligible frequency components may be provided by a DC power supply.

The power supply 106 may provide power to various electronic components of the board 102 through one or more pairs of voltage terminals. For example, the power supply 106 may provide a power supply to various electrical components on the board 102. The power supply line may include a VDD line (e.g., power line, power supply pin, etc.) and a VSS line (ground line, ground pin, etc.). Although a power supply 106 is depicted in FIG. 1 to be implemented on the board 102, various embodiments of the present disclosure include a board 102 that does not have a power supply 106. In this respect, the board 102 may comprise one or more power supply pins that are operable to receive a DC voltage from an external source such as an external power supply.

The electronic system 100 further comprises multiple circuit devices 112a-n. A circuit device 112 may be a semiconductor device comprising one or more circuits fabricated on a substrate. In this respect, a circuit device 112 may comprise a chip. The circuit device 112 comprises processing circuitry for implementing various computational processes. The processing circuitry may comprise, for example, a processor core. The processing circuitry may also comprise, for example, one or more circuits, application specific circuits, digital signal processors, analog processing circuitry, digital processing circuitry, one or more central processing units, field programmable gate arrays, programmable logic devices, state machines, or any combination thereof. In yet other embodiments, the processing circuitry may include one or more software modules executable within one or more processing circuits of the processing circuitry. The processing circuitry may further include memory configured to store instructions and/or code that causes the processing circuitry to execute data processing functions.

The circuit device 112 may be encapsulated by a processor package. The processor package physically protects the circuit device 112 from external environments. Furthermore, the processor package provides electrical conductivity between the circuit device 112 and the board 102. The processor package may comprise a package substrate.

A circuit device 112 may be dedicated to perform one or more processing functions. The circuit device 112 may comprise a wireless communication chip that uses a particular wireless communication protocol. For example, the circuit device 112 may comprise a Wi-Fi chip, a Bluetooth chip, a global positioning system (GPS) chip, or any other chip that implements wireless communication protocol. As another non-limiting example, the circuit device 112 may comprise a processor such as, for example, a baseband processor, an application specific integrated circuit, a processor core, a digital signal processor, or any other processor.

The power supply 106 may be communicatively coupled to each of the circuit devices 112. A power supply line may interconnect the various electronic components, including the circuit devices 112, of the electronic system 100 with one another. Thus, the power supply line is shared between each of the circuit devices 112. Each of the circuit devices 112 receives a power supply signal 118 via a power supply line. The power supply signal 118 may comprise a DC voltage component as well as residual frequency components and/or harmonics introduced through the operation of one or more circuit devices 112.

The various circuit devices 112 may communicate with one another via a communication bus 124. The communication bus 124 may provide relatively high-bandwidth data communications between the components of the board 102. The use of a communication bus 124 may require each of the circuit devices 112 to include a respective communication bus interface. Additionally, a bus controller 127 may be required to control data flow via the communication bus 124.

Next, a general description of the operation of the various components of the electronic system 100 is provided. To begin, a first circuit device 112a may communicate information to the second circuit device 112n. If the communication of this information requires a relatively large amount of bandwidth, information may be communicated via the communication bus 124. For example, a direct memory access, a read operation, a write operation, the transfer of a large amount of data, or any other communication that requires a relatively large amount of bandwidth may be communicated via the communication bus 124.

For data communication between the first circuit device 112a and the second circuit device 112n that requires a relatively low amount of bandwidth, the circuit devices 112 may use the power supply lines to communicate this data. For example, control information or any other communication information may be transmitted via the power supply line while substantive data is transmitted via the communication bus 124.

Non-limiting examples of data communicated over the power supply line include wireless coexistence data, power cycling data, control parameters, or any other control signal. For example, the first circuit device 112a may comprise a wireless receiver/transmitter that implements a first wireless communication protocol and the second circuit device 112n may comprise a wireless receiver/transmitter that implements a second wireless communication protocol. A wireless communication protocol may be, for example, an Institute of Electrical and Electronics Engineers (IEEE) 802 wireless communication protocol, a GPS protocol, a cellular communication protocol, or any other wireless protocol. Wireless coexistence issues may arise where transmission frequencies associated with the first wireless communication protocol interfere with transmission frequencies associated with the second wireless communication protocol. For example, the first circuit device 112a may cause a transmission of a wireless signal in a frequency range that is near to the transmission frequency range of a wireless signal initiated by the second circuit device 112n.

To address wireless coexistence issues, the various circuit devices 112 may communicate with one another to avoid interference with one another. In this respect, the communication data transmitted via the power supply line may comprise transmission frequency information, an instruction to refrain from using a particular transmission frequency range, and instruction to use a particular transmission frequency range, or any other wireless coexistence-related information. To this end, various circuit devices 112 may communicate with one another to avoid transmitting/receiving in a manner that may lead to interference. The circuit devices 112 may be configured during design or production to avoid interference by fixing the frequencies and/or frequency settings of the components of a circuit device 112.

In addition, the information transmitted via the power supply lines may comprise power cycling data. Power cycling data may relate to an instruction to change the power state of a circuit device 112. For example, a first circuit device 112a may send an instruction via the power supply line to a second circuit device 112n to cause the second circuit device 112n to change its power state. A change in power state may comprise, for example, powering down at least a portion of a circuit device 112 into a low-power state or powering up at least a portion of a circuit device 112 into an active state. The first circuit device 112a may comprise a processor such as a host processor that controls the power state of other circuit devices 112n. As another non-limiting example, power cycling data may comprise information relating to a particular circuit device's 112 power state. For example, if a first circuit device 112a changes its power state, the first circuit device 112a may inform another circuit device 112n of this change of power state via the power supply line.

Moreover, the information transmitted via the power supply line may comprise one or more control parameters. Control parameters may be passed from one circuit device 112 to another circuit device 112 via the power supply line.

Figure 2:
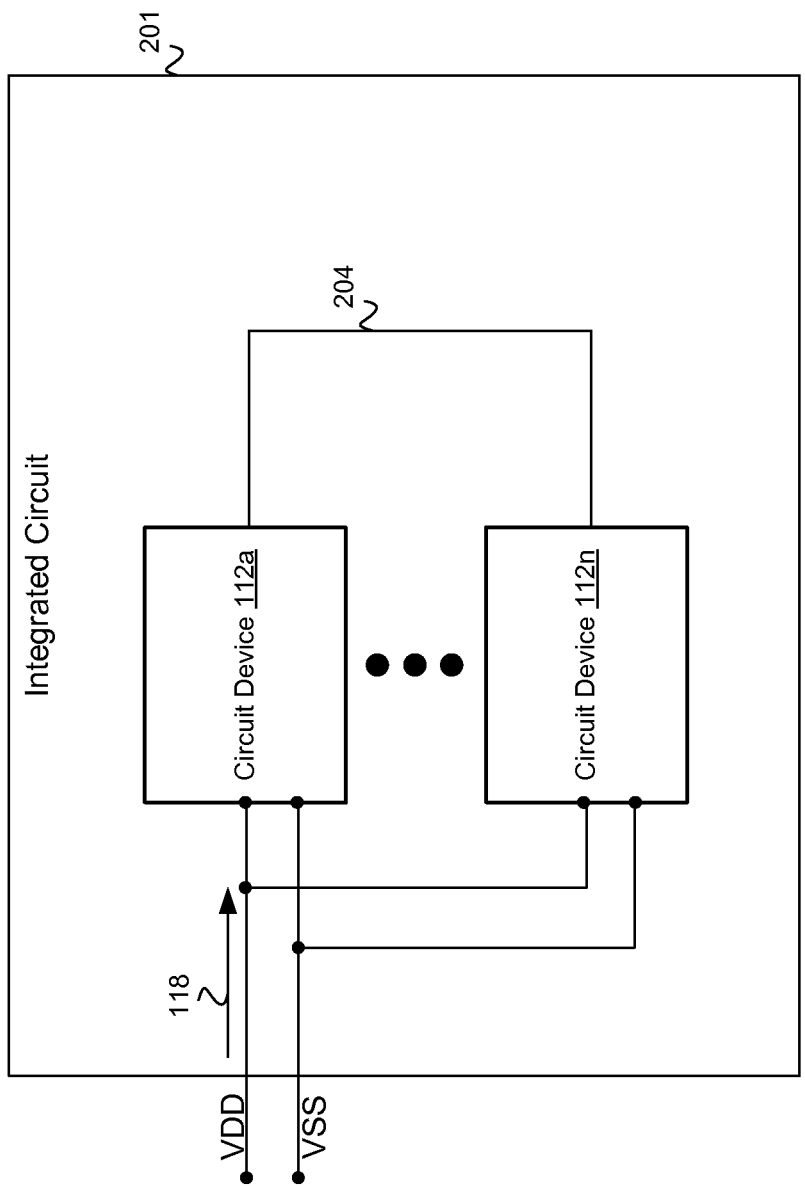
FIG. 2 is a drawing of another example of an electronic system at an integrated circuit level, according to various embodiments of the present disclosure.

Turning now to FIG. 2, shown is a drawing of another example of an electronic system 100, according to various embodiments of the present disclosure. The non-limiting example of FIG. 2 provides one among a plurality of arrangements of the electronic system 100. Specifically, the non-limiting example of FIG. 2 depicts a circuit device 112 as a region of a chip 201.

Each circuit device 112 of the non-limiting example of FIG. 2 may comprise processing circuitry that implements various computational processes. The processing circuitry may comprise, for example, a processor core. The processing circuitry may also comprise, for example, one or more circuits, application specific circuits, digital signal processors, analog processing circuitry, digital processing circuitry, one or more central processing units, field programmable gate arrays, programmable logic devices, state machines, or any combination thereof. In yet other embodiments, the processing circuitry may include one or more software modules executable within one or more processing circuits of the processing circuitry. The processing circuitry may further include memory configured to store instructions and/or code that causes the processing circuitry to execute data processing functions. To this end, a single chip 201 may be an integrated circuit or any other chip that comprises multiple circuit devices 112.

A circuit device 112a may communicate with another circuit device 112n within the same chip 201 via a bus 204. The bus 204 may impose hardware requirements that are similar to the hardware requirements imposed by the communication bus 124 of FIG. 1. Thus, the circuit devices 112 may instead communicate with one another via the power supply lines that interconnect the circuit devices 112 throughout the chip 201.

The chip 201 may comprise one or more power supply pads for receiving a power supply signal 118. In this respect, the power supply lines communicatively couple each of the circuit devices 112 with one another. As is discussed in further detail below, the power supply lines provide a DC voltage to the various circuit devices 112 while also providing a channel for communicating information between the various circuit devices 112.

The non-limiting examples of FIG. 1 and FIG. 2 provide various arrangements of circuit devices 112 in an electronic system 100. Although FIG. 1 and FIG. 2 provide a few examples of arranging circuit devices 112, various embodiments of the present disclosure are directed to other arrangements of the circuit devices 112. For example, each circuit device 112 may correspond to a semiconductor die within a multi-die stack. Thus, a circuit device 112 may comprise a single semiconductor device, a portion of a semiconductor device, a chip, or any other combination of electronic circuits.

Figure 3:
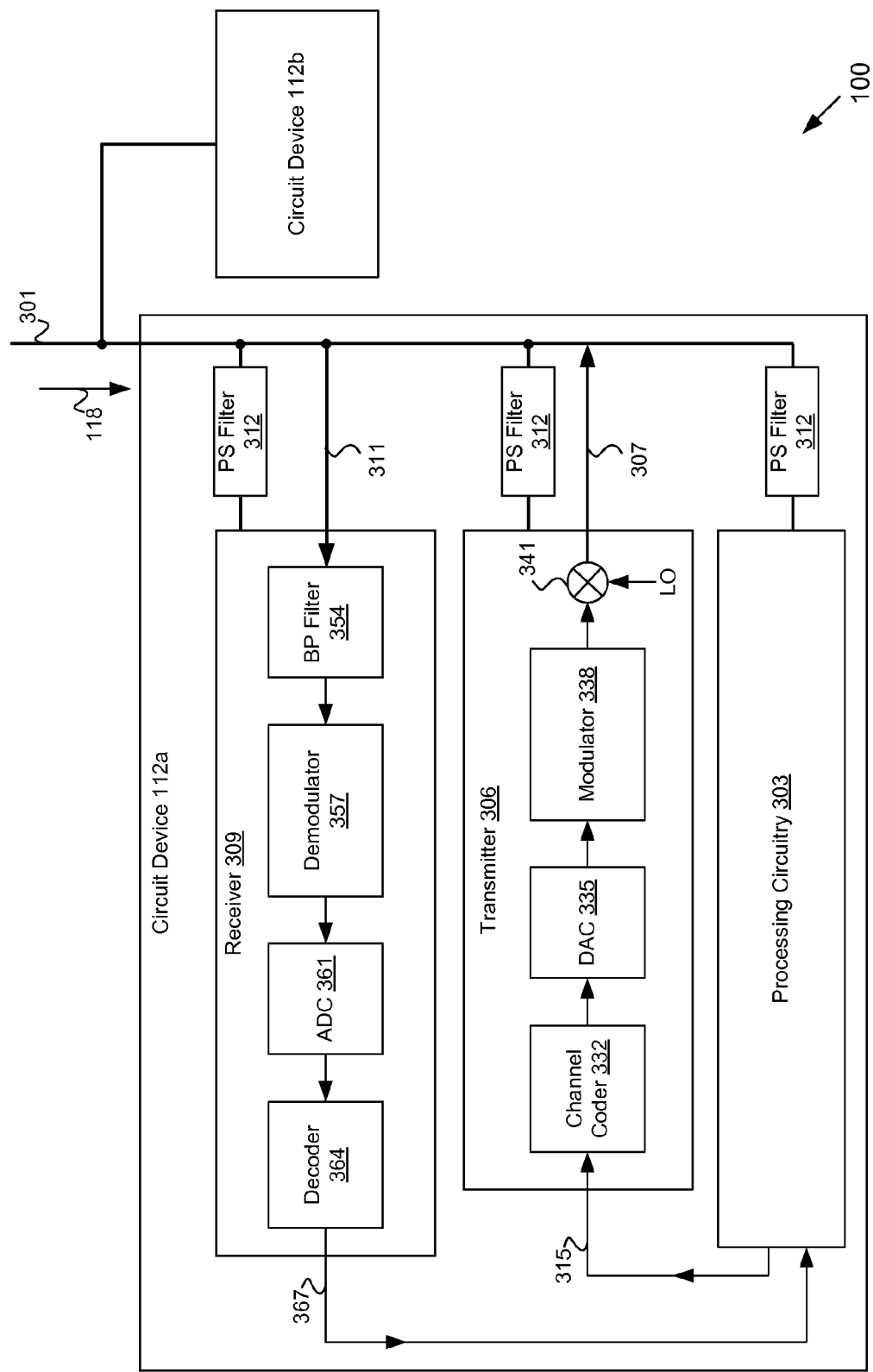
FIG. 3 is a drawing of an example of a circuit device implemented in an electronic system of FIG. 1 or FIG. 2, according to various embodiments of the present disclosure.

Moving to FIG. 3, shown is a drawing of an example of a circuit device 112 implemented in an electronic system 100 of FIG. 1 or FIG. 2, according to various embodiments of the present disclosure. FIG. 3 provides a non-limiting example of data communication between two or more circuit devices 112 via the power supply line 301.

The power supply line 301 may comprise a network of metal lines that interconnect the plurality of circuit devices 112 to one or more power supply pins. The power supply line 301 may comprise metal traces in a printed circuit board, conductive wires, metal layers fabricated above a semiconductor substrate, metal pads for providing conductivity of a semiconductor device, or any combination thereof. The power supply line 301 facilitates a transfer of a power supply signal to various electronic components such as one or more circuit devices 112. The power supply signal 118 comprises at least a DC voltage component for delivering a DC power supply to the circuit devices 112. To this end, portions of each circuit device 112 are electrically powered by the DC voltage supplied by the power supply line 301.

Each circuit device 112 may comprise processing circuitry 303 to effectuate the functionality of the circuit device 112. The processing circuitry 303 may comprise portions such as one or more digital logic blocks and/or analog components where the digital logic blocks and/or analog components perform various processing operations on data. The processing circuitry 303 may comprise various circuitry components such as, for example, local oscillators (LO), analog to digital converters (ADC), digital to analog converters (DAC), or phase locked loops (PLL). Some of the circuitry components may introduce frequency components into the power supply signal 118. The processing circuitry 303 may generate one or more data signals for wireless communication according to a wireless communication protocol. The generation of these data signals can be based upon analog circuit components that introduce frequency components into the power supply signal 118. Thus, while the power supply signal 118 comprises a DC voltage component, frequency components may consequently be introduced.

A circuit device 112 may comprise a transmitter 306 for injecting a communication signal 307 into the power supply line 301. The circuit device 112 may also comprise a receiver 309 for receiving a communication signal 311 that may be present in the power supply signal 118. Each circuit device 112 may comprise a transmitter 306 and/or a receiver 309 for sending communication signals 307 to one another and for receiving communication signals 311 from one another.

The various components of a circuit device 112 such as, for example, the processing circuitry 303, the transmitter 306, the receiver 309, or any other component may be powered via the power supply line 301. The power supply signal 118 supplied by the power supply line 301 provides at least a DC voltage to each of these components of the circuit device 112. According to various embodiments, the power supply signal 118 is filtered by a power supply filter 312 to provide a filtered power supply signal to each component in the circuit device 112. The power supply filter 312 may comprise a filter that removes various frequency components from the power supply signal 118. For example, the power supply filter 312 may substantially remove all alternating current (AC) components from the power supply signal 118 to deliver a DC voltage to each component in the circuit device 112. Through the course of operation, the various components of the circuit device 112 may consequently introduce frequency components into the power supply line 301 as these components are being powered via the power supply 301. The frequency components may be substantially removed from the power supply signal by the power supply filter 312.

A local circuit device 112a may communicate information to a remote circuit device 112b via the shared power supply line 301. The local circuit device 112a may use a transmitter 306 to inject a communication signal 307 into the power supply line 301 to facilitate this communication. In response, the remote circuit device 112b may use a receiver 309 to receive the injected communication signal 307.

In some embodiments, the information may be formatted in the digital domain as a digital communication signal 315. The digital communication signal 315 may be generated by the processing circuitry 303. The digital communication signal 315 may comprise information relating to wireless coexistence, power cycling, any parameter, any control information, any other data communication, or any combination thereof. For example, the processing circuitry 303 of the local circuit device 112a may be operable to instruct, control, or inform the remote circuit device 112b using the information expressed in the digital communication signal 315.

The transmitter 306 receives the digital communication signal 315, processes the digital communication signal 315 to generate the communication signal 307, and injects the communication signal 307 into the power supply line 301. The transmitter 306 may comprise a channel coder 332, a DAC 335, a modulator 338, a mixer 341, or any other component used to communicate information via the power supply line 301. The channel coder 332 may be operable to encode, encrypt, or otherwise digitally process the digital communication signal 315. The channel coder 332 may use various digital operations such as, for example, forward error correction, or any other coding operation to encode the digital communication signal 315. The channel coder 332 generates an encoded digital communication signal. A DAC 335 converts the encoded digital communication signal into an analog communication signal.

The modulator 338 modulates the analog communication signal to generate a modulated analog communication signal. The modulator 338 may use amplitude modulation, double sideband modulation, single sideband modulation, vestigial sideband modulation, quadrature amplitude modulation, frequency modulation, phase modulation, or any other analog modulation. Through the use of a mixer 341, the modulated analog communication signal may be shifted in frequency to a carrier frequency based on a local oscillator frequency. The output of the mixer 341 is referred to as the communication signal 307, where the communication signal 307 comprises the information expressed in the digital communication signal 315. The transmitter 306 injects the communication signal 307 into the power supply line 301. The power supply signal 118 therefore comprises a DC voltage component and the communication signal 307.

In various embodiments, the communication signal 307 comprises a carrier frequency that is determined by the local oscillator input of the mixer 341. The carrier frequency of this communication signal 307 may be selected according to frequency planning. In this respect, the carrier frequency is selected to avoid other frequencies used by other components in the system and harmonics introduced into the power supply line 301.

The remote circuit device 112b may comprise a receiver 309 to detect the injected communication signal 307 and extract information expressed in the communication signal 307. The remote circuit device 112b may use a receiver 309 to detect and identify information transmitted via the power supply line 301. Additionally, the remote circuit device 112b may inject a communication signal 311 into the power supply line 301 for communicating information to the local circuit device 112a.

The local circuit device 112a may detect the communication signal 311 that is transmitted from the remote circuit device 112b via the power supply line 301. The power supply signal 118 may comprise the communication signal 311, where the communication signal 311 is associated with a particular carrier frequency.

The receiver 309 of the local circuit device 112a may comprise a filter such as, for example, a bandpass filter 354, a demodulator 357, an ADC 361, a decoder 364, or any other component used to handle and process the communication signal 311. The bandpass filter may filter the power supply signal 118. The bandpass filter 354 may be configured to substantially isolate those frequencies that are near the carrier frequency of the communication signal 311. The filtered power supply signal is demodulated by a demodulator 357. The demodulator 357 may extract information expressed in the communication signal 311 using the carrier frequency of the communication signal 311. The demodulated communication signal is formatted in the analog domain. The receiver comprises an ADC 361 to convert the demodulated communication signal into a digital communication signal.

A decoder 364 is operable to decode the digital communication signal to extract the information expressed in the communication signal 311. For example, the decoder 364 may perform one or more decoding operations such as, for example, a cyclical redundancy check, error detection, data decryption, or any other decoding operation. The output of the receiver 309 is a decoded digital communication signal 367 that contains the information expressed in the communication signal 311. The decoded digital communication signal 367 may be transmitted to one or more logic blocks of the processing circuitry 303 for processing the decoded digital communication signal 367.

The decoded digital communication signal 367 may comprise a control parameter, an instruction, or any other information conveyed by the remote circuit device 112b. The processing circuitry 303 of the local circuit device 112a may process the decoded digital communication signal 367 accordingly.

Figure 4:
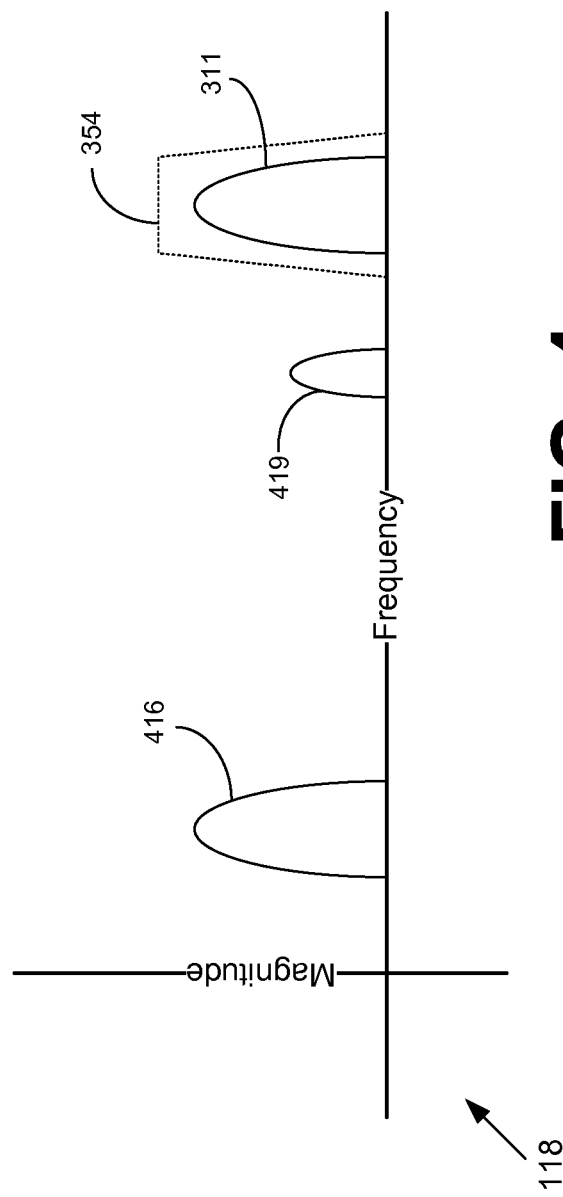
FIG. 4 is a drawing of a power supply signal in the circuit device of FIG. 3, according to various embodiments of the present disclosure.

With regard to FIG. 4, shown is a drawing of a power supply signal 118 in the circuit device of FIG. 3, according to various embodiments of the present disclosure. The power supply signal 118 may be supplied via a power supply line 301 (FIG. 3) that interconnects multiple circuit devices 112a-n. The power supply signal 118 may comprise a DC component and an AC component. The DC component comprises a DC voltage used to supply power to portions of a circuit device 112. The AC component is depicted in the non-limiting example of FIG. 4.

The AC component may comprise one or more frequency components. Various circuit components of a circuit device 112 such as, for example, a PLL, a LO, a DAC, an ADC, or any other circuit component may introduce a frequency component 416 into the power supply signal 118. Current leakage or any other residual effect of executing portions of the circuit device 112 may consequently result in the introduction of a frequency component 416 into the power supply signal 118. Additionally, the non-linearity of executing portions of the circuit device 112 may result in harmonic frequency components 419.

In selecting a carrier frequency for transmitting a communication signal 311, frequency planning may be used. In this respect, the carrier frequency of the communication signal 311 may be selected in a manner that avoids those frequency components 416 or harmonics 419 introduced by various circuit components of the circuit device 112.

The receiver 309 (FIG. 3) that receives the communication signal 311 may use a bandpass filter 354 to substantially isolate those frequencies that are near the carrier frequency of the communication signal 311. The bandpass filter 354 may reject other frequency components that may be present in the power supply signal 118.

Figure 5:
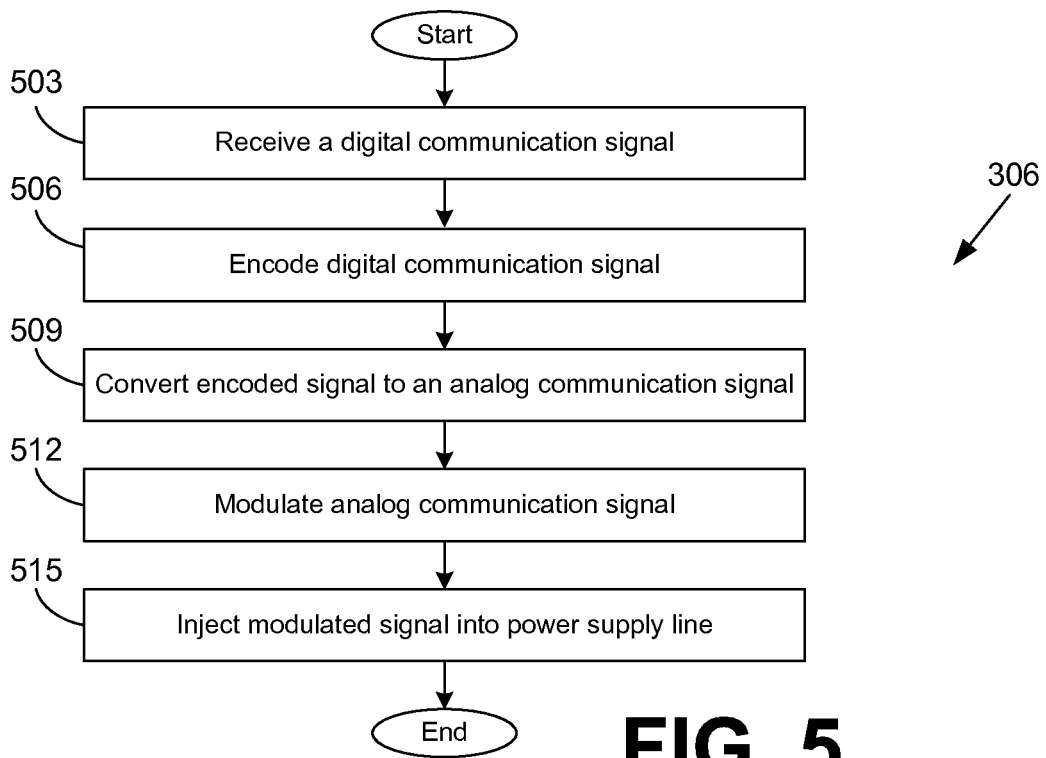
FIG. 5 is a flowchart illustrating one example of functionality implemented as portions of a transmitter of the circuit device of FIG. 3, according to various embodiments of the present disclosure.

Turning now to FIG. 5, shown is a flowchart that provides an example of operation of a portion of the logic executed by the transmitter 306 of the circuit device 112 of FIG. 3, according to various embodiments. It is understood that the flowchart of FIG. 5 provides merely an example of the many different types of functional arrangements that may be employed to implement the operation of the portion of the logic executed by the transmitter 306 as described herein. As an alternative, the flowchart of FIG. 5 may be viewed as depicting an example of steps of a method implemented in the transmitter 306 according to one or more embodiments. Specifically, the non-limiting example of FIG. 5 depicts a transmitter 306 that is implemented in a local circuit device 112a.

Beginning at 503, the transmitter 306 receives a digital communication signal 315 (FIG. 3). The digital communication signal 315 may comprise information such as an instruction, a status, a parameter, or any other information that is to be relayed from a local circuit device 112a (FIG. 3) to a remote circuit device 112b (FIG. 3). The information expressed in the digital communication signal 315 may be used to facilitate wireless coexistence between the local circuit device 112a and the remote circuit device 112b. The information may be used to pass control information or parameters between the local circuit device 112a and the remote circuit device 112b. The information may also be used to relay power cycling information or instructions between the local circuit device 112a and the remote circuit device 112b. In various embodiments, the digital communication signal 315 is generated by processing circuitry 303 (FIG. 3) of the local circuit device 112a.

At 506, the transmitter 306 encodes the digital communication signal 315. The transmitter 306 may use a channel coder 332 (FIG. 3) to encode the digital communication signal and generate an encoded digital communication signal. The channel coder 332 may use various digital operations such as, for example, forward error correction, or any other coding operation to encode the digital communication 315.

The transmitter 306 converts the encoded digital communication signal into an analog communication signal at 509. The transmitter 306 may comprise a DAC 335 (FIG. 3) to convert digital signals into analog signals. The transmitter 306 modulates the analog communication signal at 512. The transmitter 306 generates a modulated analog communication signal using a modulator 338 (FIG. 3). The modulator 338 may use a mixer 341 (FIG. 3) to shift the frequency of the modulated analog communication signal according to a carrier frequency. A local oscillator may be used to specify the carrier frequency of the modulated analog communication signal. The carrier frequency may be selected in a manner that avoids frequency components that may be present in a power supply signal 118 (FIG. 3). The modulated analog communication signal may be referred to as a communication signal 311 (FIG. 3). This communication signal 311 represents the output of the transmitter 306.

At 515, the transmitter 306 injects the modulated analog communication signal into the power supply line 301 of FIG. 3. For example, the transmitter 306 adds the modulated analog communication signal to the power supply signal 118. To this end, the power supply signal 118 comprises a DC component of the DC voltage and an AC component that comprises the modulated analog communication signal.

Because the power supply line 301 interconnects the local circuit device 112a and a remote circuit device 112b, the remote circuit device 112 receives the power supply signal 118, where the power supply signal 118 supplies a DC voltage while also relaying the modulated analog communication signal to the remote circuit device 112b.

As discussed above, the non-limiting example of FIG. 5 depicts a transmitter 306 that handles a digital communication signal. In embodiments where the transmitter 306 is implemented in a local circuit device 112a that comprises analog circuitry, the transmitter 306 does not necessarily need to perform digital to analog conversion. Instead, the transmitter 306 may receive an analog communication signal that comprises information such as an instruction, a status, a parameter, or any other information. The transmitter 306 modulates the analog communication signal and then injects the modulated analog communication signal into the power supply line 301 for communication with a remote circuit device 112 over a power supply line 301.

Figure 6:
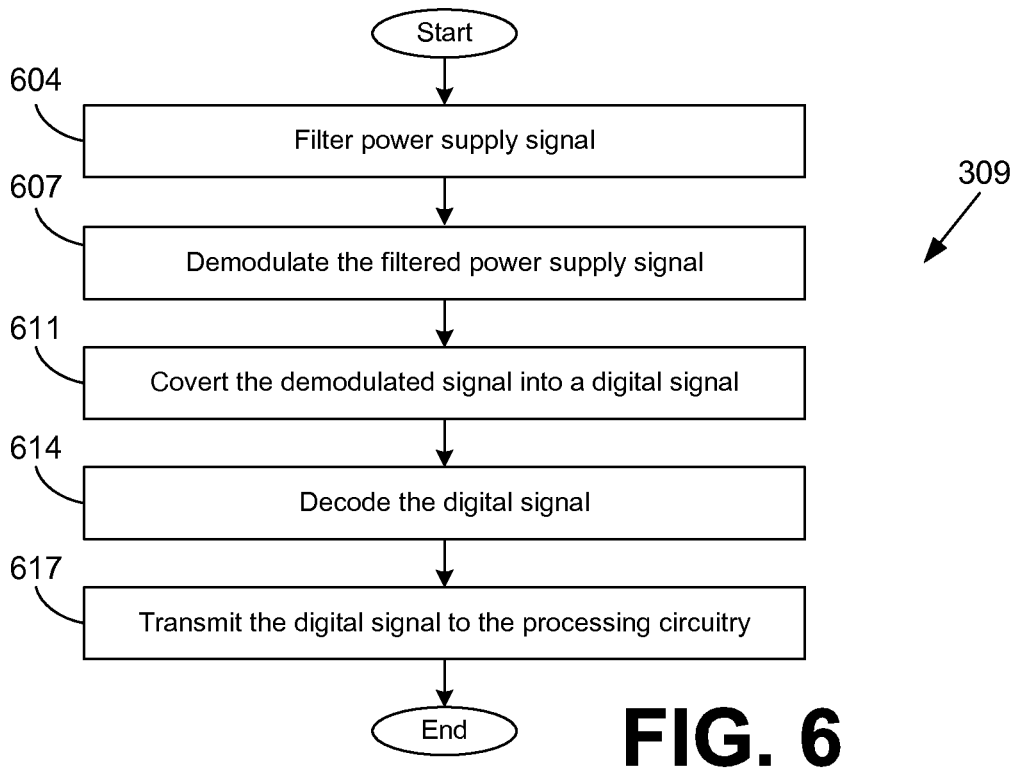
FIG. 6 is a flowchart illustrating one example of functionality implemented as portions of a receiver of the circuit device of FIG. 3, according to various embodiments of the present disclosure.

Referring next to FIG. 6, shown is a flowchart that provides an example of operation of a portion of the logic executed by the receiver 309 of the circuit device 112 of FIG. 3, according to various embodiments. It is understood that the flowchart of FIG. 6 provides merely an example of the many different types of functional arrangements that may be employed to implement the operation of the portion of the logic executed by the receiver 309 as described herein. As an alternative, the flowchart of FIG. 6 may be viewed as depicting an example of steps of a method implemented in the receiver 309 according to one or more embodiments. Specifically, the non-limiting example of FIG. 6 depicts a receiver 309 that is implemented in a local circuit device 112a.

Beginning at 604, the receiver 309 filters the power supply signal 118 (FIG. 3). The receiver 309 may use a filter such as the bandpass filter 354 of FIG. 3 to generate a filtered power supply signal. The bandpass filter 354 may be configured to substantially isolate a range of frequencies associated with the filtered power supply signal. The filtered power supply signal may be referred to as a communication signal 311 (FIG. 3). The filtered power supply signal may comprise information such as an instruction, a status, a parameter, or any other information that is relayed from a remote circuit device 112b (FIG. 3) to the local circuit device 112a (FIG. 3). The information expressed in the filtered power supply signal may be used to facilitate wireless coexistence between the local circuit device 112a and the remote circuit device 112b. The information may be used to pass control information or parameters between the remote circuit device 112b and the local circuit device 112a. The information may also be used to relay power cycling information or instructions between the remote circuit device 112b and the local circuit device 112a. In various embodiments, the filtered power supply signal is generated or is otherwise originated by the remote circuit device 112b.

A 607, the receiver 309 demodulates the filter power supply signal. The receiver 309 may use a demodulator 357 (FIG. 3) to generate a demodulated analog communication signal. The receiver 309 converts the demodulated analog communication signal into a digital communication signal at 611. The receiver 309 may comprise an ADC 361 (FIG. 3) to convert analog signals into digital signals. The receiver 309 decodes the digital communication signal at 614. The receiver 309 may use a decoder 364 (FIG. 3) to perform one or more decoding operations on the digital communication signal. The decoder 364 may perform error correction, decryption, or any other digital formatting for processing the digital vacation signal.

At 617, the receiver 309 transmits the decoded digital communication signal 367 (FIG. 3) to the processing circuitry 303 (FIG. 3) of the local circuit device 112a. The decoded digital communication signal may comprise information expressed in the communication signal 311 received via the power supply line 301. The decoded digital communication signal may comprise information such as, for example, a parameter, an instruction, a status, or any other information that is transmitted from a remote circuit device 112b.

As discussed above, the non-limiting example of FIG. 6 depicts a receiver 309 that obtains a decoded digital communication signal 367 from a power supply signal 118 transmitted via a power supply line 301. In embodiments where the receiver 309 is implemented in a local circuit device 112a that comprises digital circuitry, the receiver 309 does not necessarily need to perform analog to digital conversion. Instead, the receiver 309 may directly transmit the demodulated analog communication signal to portions of local circuit device 112a for analog processing of the demodulated analog communication signal. Analog processing may comprise using the information expressed in the demodulated analog communication signal to perform one or more analog operations.

The flowcharts of FIGS. 5-6 show the functionality and operation of an implementation of portions of the circuit device 112 implemented in an electronic system 100 (FIGS. 1-2). Particularly, FIGS. 5-6 depict the functionality of a receiver 309 and transmitter 306 used to facilitate communication between circuit devices 112 where the circuit device may be analog and/or digital. If embodied in software, each reference number, represented as a block, may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code. If embodied in hardware, each block may represent a circuit or a number of interconnected circuits to implement the specified logical function(s).

Although the flowcharts of FIGS. 5-6 depict a specific order of execution, it is understood that the order of execution may differ from that which is depicted. For example, the order of execution of two or more blocks may be scrambled relative to the order shown.

Also, two or more blocks shown in succession in FIGS. 5-6 may be executed concurrently or with partial concurrence. Further, in some embodiments, one or more of the blocks shown in FIGS. 5-6 may be skipped or omitted. In addition, any number of counters, state variables, warning semaphores, or messages might be added to the logical flow described herein, for purposes of enhanced utility, accounting, performance measurement, providing troubleshooting aids, etc. It is understood that all such variations are within the scope of the present disclosure.

Also, any logic or application described herein, including the circuit device 112, that comprises software or code can be embodied in any non-transitory computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, at least the following is claimed:

1. A method, comprising:
communicating, by a first circuit, with a second circuit via a communication bus that communicatively couples the first circuit to the second circuit; and
communicating, by the first circuit, with the second circuit via a power supply line connected to the first circuit and the second circuit, wherein
the first circuit and the second circuit are both mounted on a same circuit board, and
the power supply line supplies a voltage to at least one of the first circuit or the second circuit.

2. The method of claim 1, wherein
the power supply line receives the voltage via a supply pin communicatively coupled to the circuit board.

3. The method of claim 1, wherein
the first circuit communicates a digital communication signal to the second circuit via the communication bus, the digital communication signal comprising a control signal to facilitate wireless coexistence of a first wireless protocol and a second wireless protocol,
the first circuit facilitating wireless communication for the first wireless protocol, and
the second circuit facilitating wireless communication for the second wireless protocol.

4. The method of claim 1, wherein
the voltage comprises a direct current (DC) voltage, and
the power supply line is operable to supply the DC voltage to the first circuit and the second circuit.

5. The method of claim 1, wherein
the first circuit comprises a local oscillator operable to generate data signals for wireless communication according to a wireless communication protocol, and
a carrier frequency is selected to avoid interference with the local oscillator.

6. A system, comprising:
a first circuit that is mounted on a circuit board and connected to a power supply line; and
a second circuit that is mounted on the circuit board and connected to the power supply line, wherein
the power supply line supplies a voltage to at least one of the first circuit or the second circuit,
the first circuit and the second circuit are communicatively coupled via a communication bus, and
the first circuit is configured to communicate with the second circuit via the communication bus and the power supply line.

7. The system of claim 6, wherein the second circuit is configured to inject a modulated analog communication signal in the power supply line, the modulated analog communication signal comprising the communication information.

8. The system of claim 6, wherein the first circuit comprises a bandpass filter to filter a power supply signal received via the power supply line to generate a filtered power signal.

9. The system of claim 8, wherein the first circuit comprises a power supply filter to filter a power supply signal before the voltage is supplied to another portion of the first circuit.

10. The system of claim 6, wherein
the first circuit is configured to process a communication signal, received via the power supply line, to identify an instruction for controlling the first circuit, and
the instruction facilitates at least one of wireless coexistence, passing of a parameter generated by the second circuit, or power cycling.

11. The system of claim 6, wherein the first circuit comprises one of a WiFi chip, a Bluetooth chip, a Global Positioning System (GPS) chip, or a baseband processor chip.

12. A system, comprising:
a circuit board,
a first circuit mounted on the circuit board;
a power supply line that supplies a voltage to the first circuit and to a second circuit; and
a communication bus that connects the first circuit to the second circuit, wherein
the second circuit is mounted on the circuit board, and
the first circuit configured is to
receive a communication signal comprising control information via the communication bus,
convert the communication signal into a modulated communication signal, and
inject the modulated communication signal into the power supply line to transmit the control information to the second circuit via the power supply line.

13. The system of claim 12, wherein
the communication signal facilitates wireless coexistence of a first wireless protocol and a second wireless protocol,
the first circuit facilitates wireless communication for the first wireless protocol, and
the second circuit facilitates wireless communication for the second wireless protocol.

14. The system of claim 12, wherein the communication signal passes a parameter or data from the first circuit to the second circuit.

15. The system of claim 12, wherein the communication signal comprises a power cycle state of the first circuit to facilitate power cycling.

16. The system of claim 12, wherein the first circuit comprises one of a WiFi chip, a Bluetooth chip, a Global Positioning System (GPS) chip, or a baseband processor.

17. The system of claim 12, wherein the first circuit comprises:
a channel coder that encodes the communication signal to generate an encoded digital communication signal;
a digital to analog converter that converts the encoded digital communication signal to an analog communication signal; and
a modulator that generates the modulated communication signal based on the analog communication signal and a local oscillator signal.

18. The system of claim 6, wherein
the first circuit communicates with the second circuit via the communication bus when the communication requires a bandwidth greater than a predetermined threshold, and
the first circuit communicates with the second circuit via the power supply line when the communication requires a bandwidth less than the predetermined threshold.

19. The system of claim 6, wherein
the first circuit communicates control parameters with the second circuit via power supply line.

20. The system of claim 6, further comprising the circuit board.

* * * * *